March 15, 1955  H. J. SNELSON  2,703,966
COOLING AND STORAGE APPARATUS FOR LIQUIDS
Filed Dec. 30, 1950  5 Sheets—Sheet 3
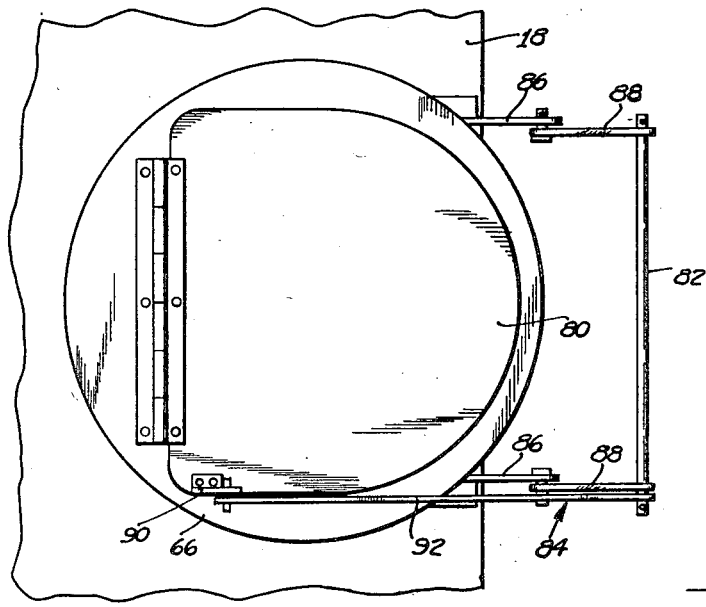
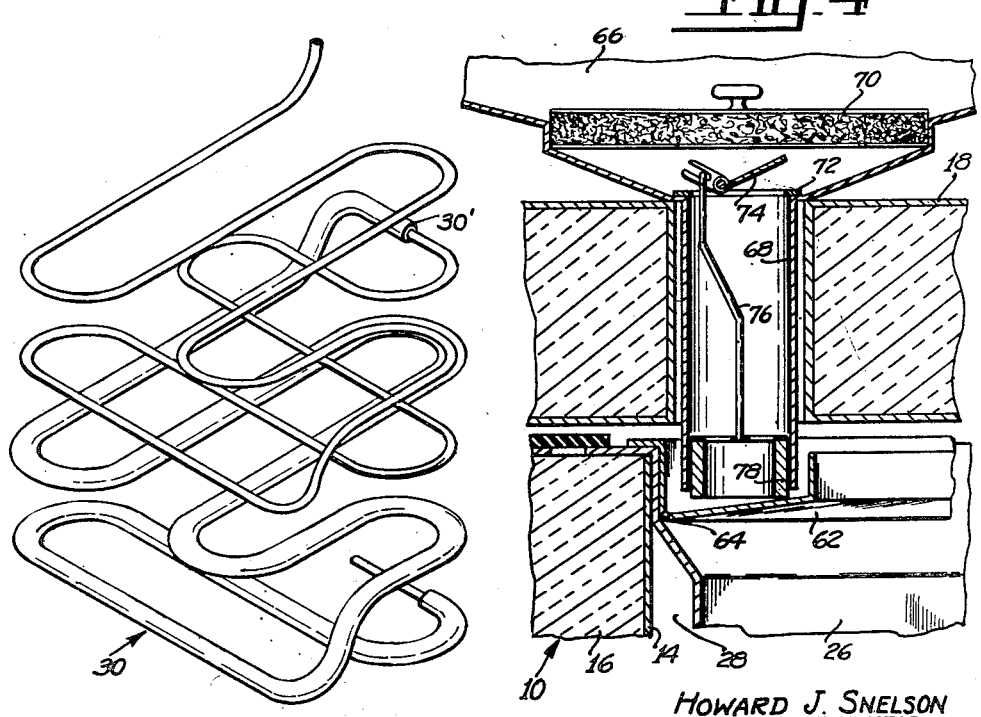
HOWARD J. SNELSON
INVENTOR.
BY Reynolds, Beach & Christensen
ATTORNEYS

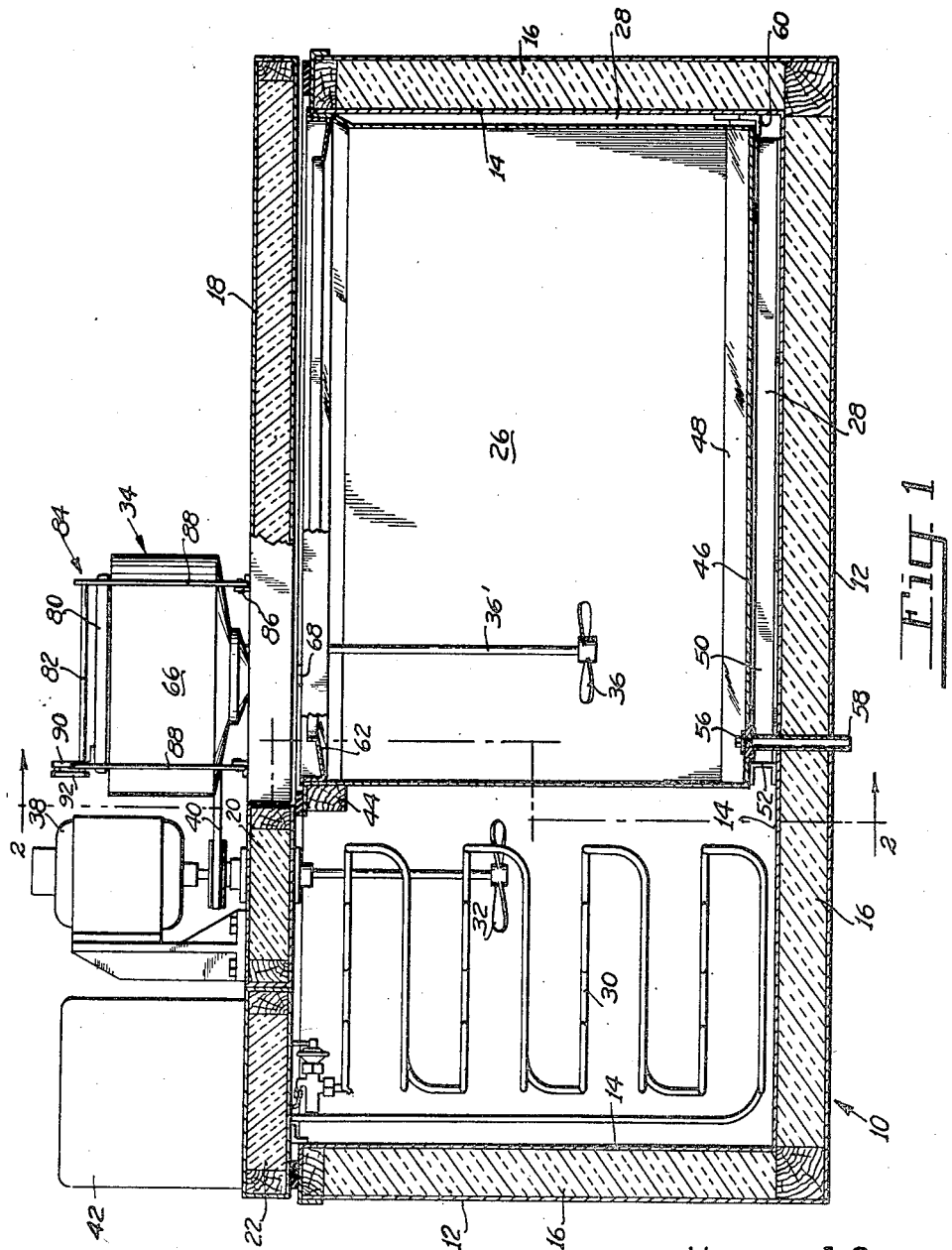

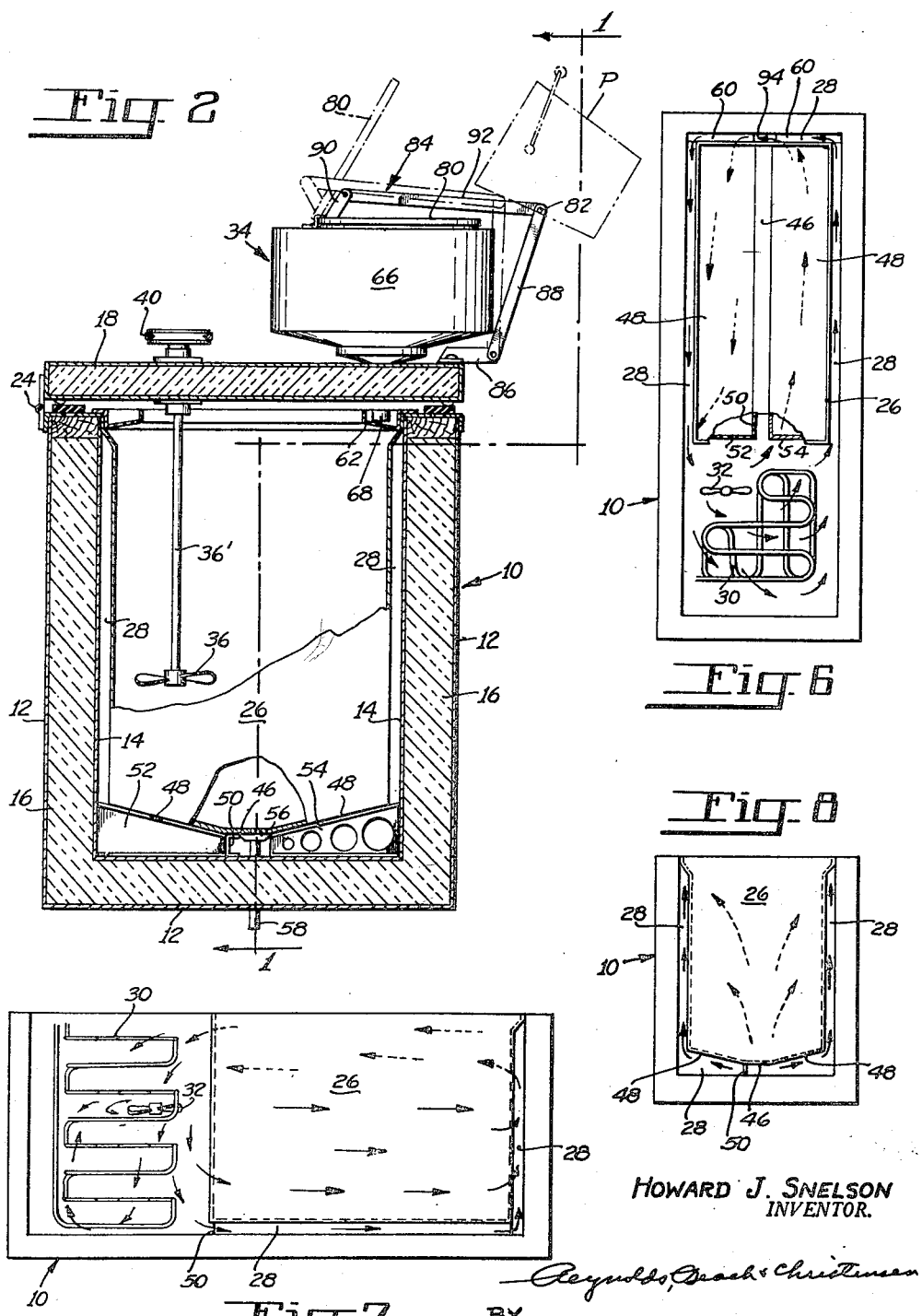

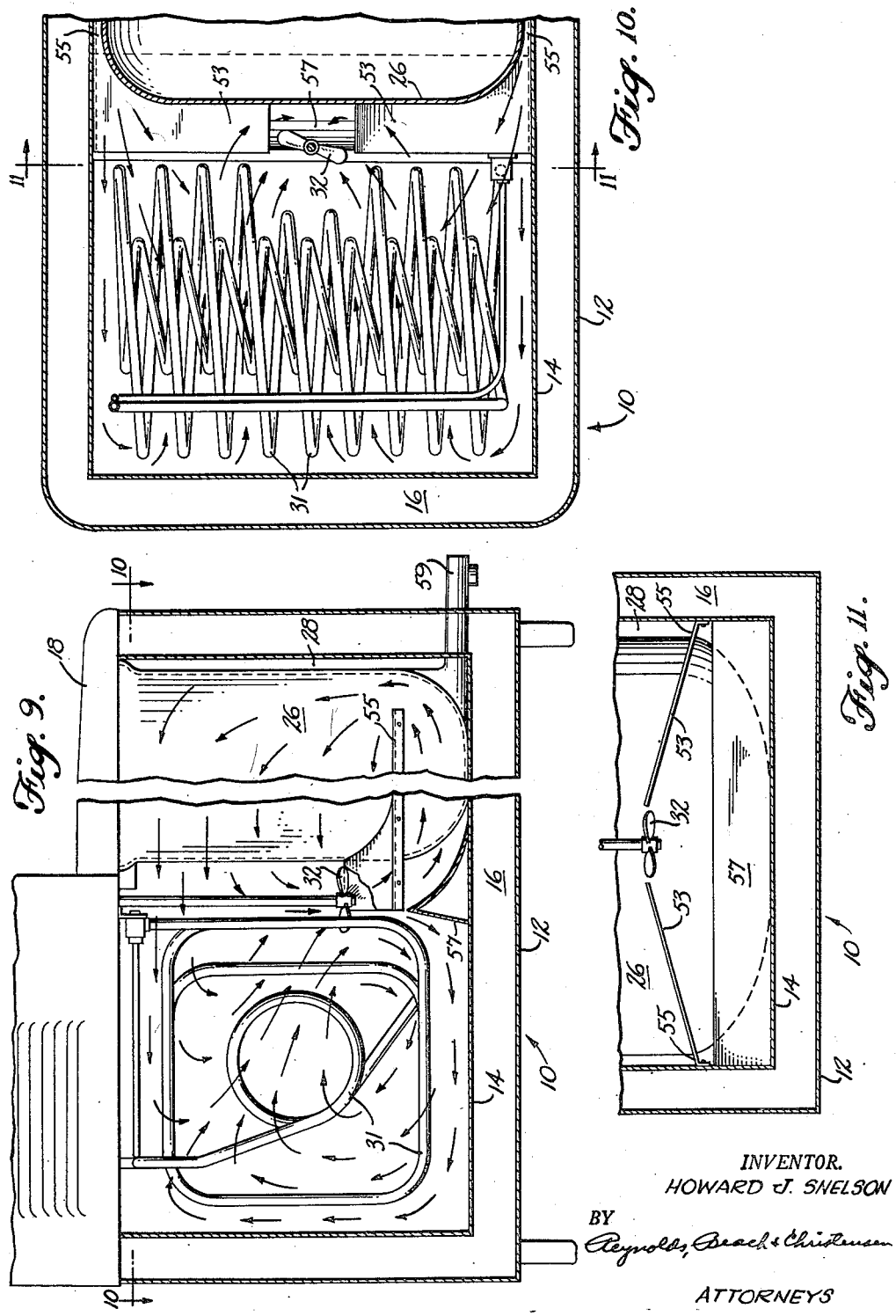

March 15, 1955 H. J. SNELSON 2,703,966
COOLING AND STORAGE APPARATUS FOR LIQUIDS
Filed Dec. 30, 1950 5 Sheets-Sheet 5
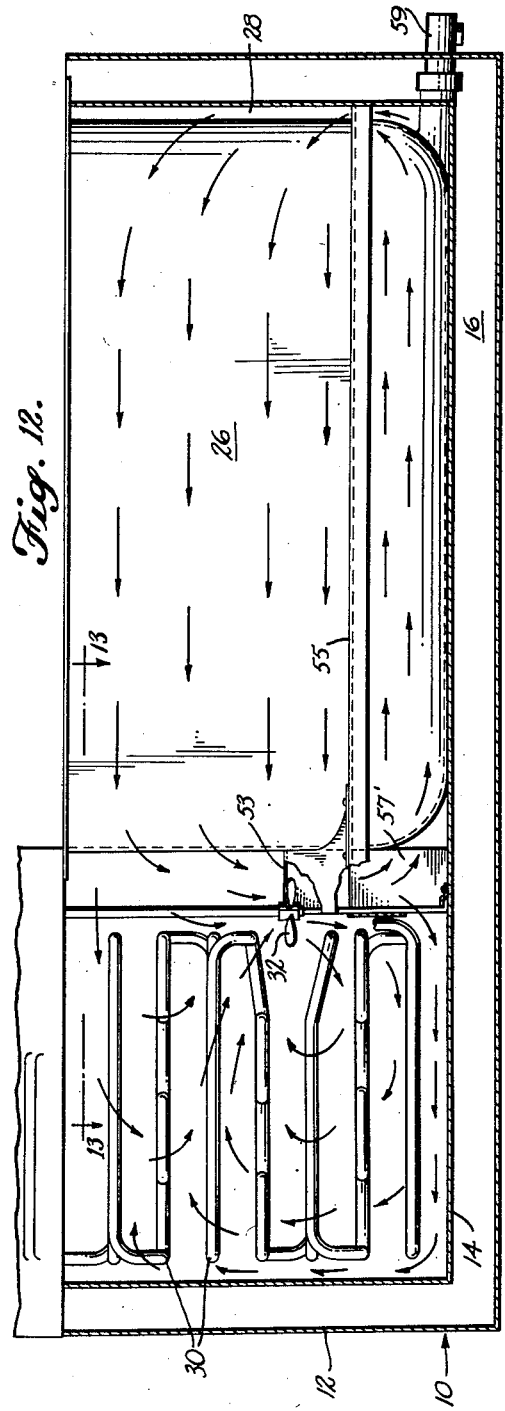
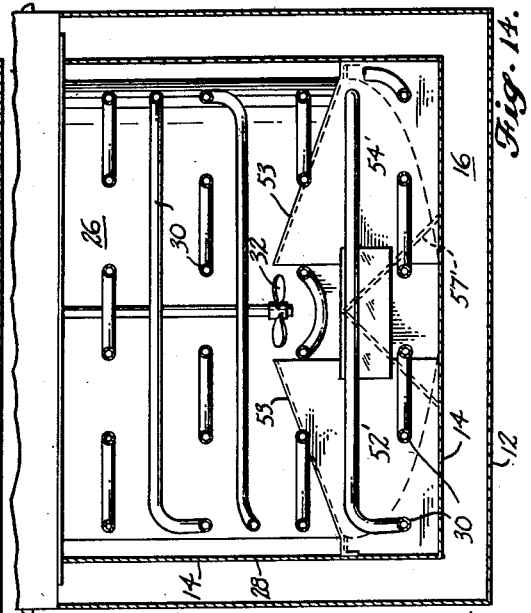
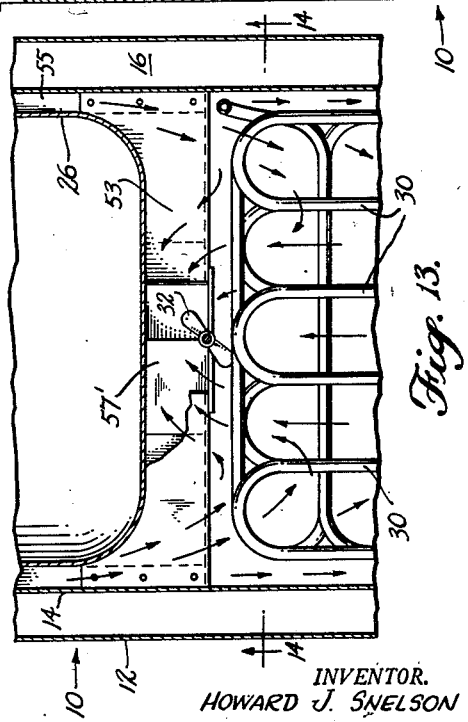
INVENTOR.
HOWARD J. SNELSON
BY
Reynolds, Beach & Christensen
ATTORNEYS

United States Patent Office 2,703,966
Patented Mar. 15, 1955

2,703,966

COOLING AND STORAGE APPARATUS FOR LIQUIDS

Howard J. Snelson, Paris, Ill., assignor of one-eighth to Lyell Jennings and one-eighth to Joseph Pasero, both of Paris, Ill.

Application December 30, 1950, Serial No. 203,638

14 Claims. (Cl. 62—101)

This invention relates to apparatus for cooling and storing liquids, and is herein illustratively described by reference to its preferred application, as a milk cooler and container.

This application is a continuation-in-part of my application Serial No. 100,329, filed June 21, 1949, for Cooling and Storage Apparatus for Liquid.

Fresh warm milk poured into such a cooler is cooled quickly to a temperature preferably below 50 degrees F., but above freezing, and is preferably also aerated to remove odors during the quick-cooling process. The cooled, aerated milk flows into a storage tank wherein it is maintained at a desired low temperature for as long as may be required.

The practice of cooling, aerating and storing milk in this general manner is useful particularly on farms producing for milk distributors who collect the milk at intervals for bottling. However, it is to be understood that the invention is not necessarily restricted to milk coolers, since it may apply as well to the cooling and storing of other liquids.

The general object of the invention is the provision of cooling and storage apparatus for liquids, which apparatus is generally more efficient, economical and satisfactory than those heretofore available. Such apparatus involves a storage tank around which cooling fluid, preferably cold water, is circulated to maintain the milk at an even low temperature.

A specific object is to provide in such apparatus more efficient types of refrigeration coil of the ice accumulation type, between and around the convolutions of which the tank cooling liquid is circulated. The coil configuration should be such that cooling liquid circulation spaces between the coil convolutions are not readily obstructed by excessive accumulations of ice on the exterior of the tubing, despite its large ice accumulating capacity, and yet the coil is formed compactly. Such accumulations of ice, less than an amount sufficient to obstruct tank cooling liquid flow, are desirable in order to increase the effective heat transfer or cooling area of the coil unit, enlarging its effective refrigeration capacity to handle peak total requirements of the apparatus, as when warm milk is being received and chilled. Because of the efficiency with which the milk tank cooling water is circulated around the coil the rate of heat removal from it by the ice is also high.

One type of coil constitutes a nest in the form of a bank of sinuous coil grids defining courses arranged in superposed parallel spaced relation and interconnected for passage of a refrigerant such as Freon gas in series through them. Each course of the refrigeration coil is formed as a grid composed of parallel straight lengths of tubing having alternate interconnecting loops at their ends to form a sinuous coil, and such straight lengths of the grids in adjacent layers are disposed mutually transversely, preferably at right angles. Thus, for instance, in one course the parallel straight tubing lengths of the coil grid may extend in series from front to rear of the cooler tank, whereas in the adjacent courses above and below the straight tubing lengths extend from side to side of the tank. With a coil of this configuration the cooling water must follow a tortuous path in circulating between and around its convolutions, extending the period of contact of the water with ice formed on the coil.

Another type of coil is composed of two helices arranged concentrically, one within the other, in which each convolution of the inner coil may be circular, and each convolution of the outer coil approximately rectangular. These helices must be spaced apart radially sufficiently to allow ample space for ice accumulation between them, as well as the adjacent convolutions in each helix being spaced apart adequately.

By virtue of the relative locations of the refrigeration coil and the milk storage tank, and the provision of effective baffles, the cooling liquid passing between the convolutions of the refrigeration coil flows by convection, with or without aid of an impeller, in a definite, closed course around the walls and bottom of the milk storage tank, to provide uniform cooling of such walls.

As a further feature of the invention the cooling and storage apparatus involves the arrangement of a cooling coil nest and a milk storage tank generally in the opposite ends, respectively, of a cooler tank. Cooperating with and located between the spaced tanks, partition means define a desired path for the flow of cooling liquid around the storage tank and through the coil nest to abstract heat uniformly from over substantially the entire wall area and bottom of the storage tank for dissipation by the refrigeration coil.

Still another object is the provision of a means to enable the milk to be poured into the storage tank more conveniently, including a distribution unit by which the milk is spread thinly over a cooling surface for chilling and aeration. Such means preferably comprises an outwardly accessible receiving tank communicating with an enclosed distribution trough mounted at the rim of the storage tank. A float valve in the trough automatically regulates the flow of milk into it from the receiving tank to insure that the capacity of the slowly draining trough is utilized but not exceeded.

These and other objects, features and advantages of the invention, including certain details of its preferred form, as herein illustrated, will now be described more fully by reference to the accompanying drawings.

Figure 1 is a longitudinal vertical sectional view of one embodiment of my improved apparatus for cooling and storing liquids, taken along line 1—1 of Figure 2.

Figure 2 is a transverse vertical sectional view of the apparatus taken on line 2—2 in Figure 1.

Figure 3 is an isometric view of one form of the refrigerating coil unit.

Figure 4 is a vertical sectional detail view of the pouring means employed in the apparatus, parts thereof being broken away for convenience in illustration.

Figure 5 is a detail plan view of a portion of the apparatus including the pouring tank, and showing a convenient mechanism for opening its lid automatically when actuated by pressure applied by a milk bucket.

Figure 6 is a simplified plan view of the same apparatus with parts broken away to show the general interior arrangement and circulatory flow of cooling liquid.

Figure 7 is a simplified longitudinal vertical sectional view of the apparatus showing the circulatory flow of cooling liquid; and Figure 8 is a simplified transverse vertical sectional view, presented for a similar purpose.

Figure 9 is a longitudinal vertical section through a different form of cooling apparatus, parts thereof being broken away, and Figure 10 is a horizontal sectional view of one end of such apparatus taken on line 10—10 of Figure 9. Figure 11 is a fragmentary transverse sectional view through the same apparatus taken on line 11—11 of Figure 10.

Figure 12 is a longitudinal vertical sectional view through still a different form of cooling tank apparatus with parts broken away, and Figure 13 is a fragmentary horizontal sectional view of such apparatus on line 13—13 of Figure 12.

Figure 14 is a transverse sectional view through the apparatus taken along line 14—14 of Figure 13.

The bulk of the apparatus, including the storage tank, refrigeration coil unit and cooling liquid, is received within an insulated cabinet 10 preferably of rectangular shape (Figure 1). The sides and bottom of this cabinet are formed of an outer wall 12 and, spaced inwardly therefrom, an inner wall 14 which serves as a container for cooling liquid, and a packing of insulation material 16 filling the hollow space between these walls. The details of construction of the cabinet frame, etc., are more or less immaterial and therefore require no special description or illustration herein.

The cooler tank 14, or the cabinet generally, is covered by three successively adjoining insulated lids 18, 20 and 22, respectively, cooperating to form the entire top of the cabinet. These are likewise of double-walled insulated construction.

Each lid spans the entire width of the cabinet from front to rear, and the lid 18 extends over the major part of the total length of the cabinet, preferably about two-thirds thereof, and is mounted on hinges 24 along a long upper edge of the cabinet. This lid covers and is substantially coextensive in length with the milk storage tank 26 received in one end portion of the cabinet. Suitable spacing is left between the proximate end walls and the side walls of the two tanks, 14 and 26, and between their respective bottoms, to define a circulating space 28 for flow of cooling liquid around the storage tank 26. Lid 18, near its hinged edge, carries a milk receiving unit 34 and agitator means 36, which latter is used to mix the milk and cream uniformly in the storage tank before sampling for butterfat tests. The agitator shaft 36' is so located on the lid relative to the latter's hinge axis that, despite the length of such shaft, the stirrer will clear the forward edge of the storage tank as the lid is swung upward, as may be seen in Figure 2.

In the end portion of the cooler tank 14 opposite storage tank 26 are received a refrigeration coil unit 30 and cooperating cooling liquid impeller means 32 to be described. This open portion of the cooler tank is covered by the adjoining lids 20 and 22, neither of which is hinged to the upper edge of the cabinet, like the lid 18, but are individually removable from the top of the cabinet. The lid 20 carries the impeller 32, its electric drive motor 38, and pulley means for driving the agitator 36 from such motor through a disconnectable V-belt transmission 40. The impeller 32 is located on its lid so as to enable it to be removed with such lid for access to the refrigeration compartment containing the refrigeration coil unit 30. This may be done to enable such coil unit to be removed from the tank. The lid 22 carries the cooling coil unit 30 and associated refrigeration unit 42 for compressing the refrigerant and circulating it through the coil. Both units are removed by removal of the lid 22.

With this general arrangement in mind, attention may now be directed to details of the storage tank 26, milk receiving means 34 and quick-cooling and aerating means cooperating therewith.

A support beam 44 extends transversely across the top of the cabinet and may in part support the end of storage tank 26 adjacent to the refrigeration coil chamber by carrying its outwardly flanged upper edge. The remaining three edges of the storage tank are similarly flanged to overlie the upper edges of the cabinet's adjacent end wall and the side walls adjoining it, as shown. The bottom of the storage tank (Figure 2) is preferably trough-shaped, having a narrow horizontal mid-portion 46 extending longitudinally and sloping side portions 48 which incline therefrom upward and outward to join the opposite side walls of the storage tank as shown. A longitudinally extending channel iron member 50 underlies the flat portion 46 of the storage tank bottom to support the same from the bottom of the cooler tank 14. This channel iron member also acts as a partition dividing the circulation space between the tank bottoms. It terminates just short of the opposite end of the storage tank 26, however, so that it will not block transverse flow of cooling liquid across the bottom of the cooler tank 14 beyond such end.

At the end of the storage tank which adjoins the support beam 44 two tapered channel iron supports 52 and 54 extend transversely of the cooler tank 14 and support the end of the storage tank 26 by its bottom (Figure 2). The tapered channel support member 52 has a closed web and acts as a cooling liquid baffle, while the web of the channel member 54 is of open or apertured construction to pass a substantial proportion of the cooling liquid.

At the end of the storage tank 26 opposite the tapered channel support members 52 and 54 the storage tank bottom is supported by the inwardly directed flanges of angle iron brackets 60 secured to the end wall of the cooler tank 14. These flanges extend inwardly from the sides of the cooler tank to terminal locations near its central portion. At such location the terminals of the flanges are spaced apart, leaving a vertical opening 94, as shown in Figure 6, for flow of cooling liquid upward along the end wall of the storage tank.

The trough-bottomed storage tank 26 has a drain 56 and a drain pipe 58 located centrally at one end, which is normally closed by a suitable plug and used in washing out the tank with clean water and disinfectant as may be necessary. Ordinarily milk will be removed from the storage tank by a suction hose, so that the tank need have no special milk outlet. It should be washed clean after each removal of milk therefrom, however.

As shown in Figures 1 and 2, and particularly in Figure 4, the open top of the storage tank 26 receives within it a milk distribution or spreader trough which preferably extends around its entire inside periphery and has an out-turned flange to overlap and rest upon the upper edge of the tank. The trough is narrow compared with the width of the storage tank, so that the central portion of such tank is left open and consequently is accessible for removing or inspecting the milk. When cleaning the tank this trough may be readily lifted out. The trough has an outwardly and downwardly sloping bottom which, at its junction with the outside vertical wall of the trough, has a series of small drain openings 64 extending around the entire closed length of the trough. Warm milk poured into the trough runs out through these openings and spreads in a thin film over the wall of the milk storage tank 26 immediately adjoining such apertures. Such milk is immediately chilled because the storage tank wall itself is kept constantly at a low temperature by cooling liquid in the outer tank, and, because the film is thin, such flow aerates the milk which removes odors.

Referring to the same three figures and also to Figure 5, the lid 18 carries a cylindrical pouring tank 66 the bottom of which funnels into a vertical spout 68 leading downward into the trough 62. A filter 70 is received in the bottom of the pouring tank 66 above the spout. The upper end of the spout is closed by an apertured partition 72 upon which pivots a valve 74, as shown in Figure 4. This valve regulates flow into the trough and is connected by a rod 76 to a float 78 received and guided for vertical movement in the lower end of the spout tube 68 and responsive to the level of milk in the spreader trough 62. As the level of milk in the trough rises progressively toward the maximum permissible level the valve 74 is moved correspondingly toward closed position to restrict the flow of milk from the tank 66 into the spout and hence into the trough. This prevents overflow of the trough and relieves the person pouring milk into the receiving tank 66 from gauging the capacity of the trough to prevent spilling. In a typical installation, the trough 62 may have a capacity of four gallons and the tank 66 several times that amount.

The top of the receiving tank 66 has a hinged cover 80 opened automatically by pressure of a milk pail against the control bar 82 acting through the linkage 84, as illustrated in Figure 2. A pair of spaced brackets 86 project forwardly from the front edge of the lid 18, as seen in Figure 2, and carry pivotally the lower ends of the upright links 88 between which the actuating rod 82 is connected for swinging inward toward the tank by pressure of a milk pail P pressed against it. A crank arm 90 projects upwardly from the side of the cover near its hinge axis and is interconnected pivotally by a generally horizontal link 92 with one end of the bar 82. As pressure is exerted by a milk pail on the bar it is swung toward the receiving tank 66, raising the cover into its broken line position shown in Figure 2. When the pail is emptied and withdrawn, releasing the bar, the weight of the cover causes it to close.

The entire apparatus carried by the lid 18, including the pouring mechanism and the agitator mechanism, is readily swung with such lid clear of the storage tank for access to its interior.

As an important feature of the invention, the refrigeration coil unit 30 is of special configuration. It comprises a group of grids disposed in horizontal planes in vertically spaced relation. Each grid is composed of sinuous convolutions including parallel straight lengths of tubing interconnected in series by substantially semicircular loops. In adjacent grids the straight lengths extend mutually transversely, preferably at right angles, as shown best in Figures 3 and 6. The spacing between successive convolutions or straight tubing sections of a grid is approximately equal to the vertical spacing between successive grids in the group. Preferably the grids are connected in series and the refrigerant pumped through them from the refrigerating unit 42 mounted on the lid 22 as shown in Figure 1.

The coil unit may appropriately be termed an "ice nest" inasmuch as a layer of ice soon forms on the nest of tubing. I have found that an ice nest or refrigeration coil of generally cubical configuration, that is a group of convolutions having generally comparable length, width and depth is particularly efficient to accumulate a compact mass of ice for cooling the cooling water in such a system over an extended period at a sufficient cooling rate without operation of the mechanical refrigeration unit 42, or to supplement the cooling of the refrigeration mechanism effectively for quick cooling without clogging the circulation space around the storage tank. The greater accumulation of ice on the tubing permitted by this type of coil configuration by bridging between the coils above, below and sidewise without blocking the passages for flow of the cooling water through the spaces between the convolutions of the ice nest, provides an effectively larger heat exchange area to cool the water more rapidly during chilling of the storage tank contents immediately after being placed in such tank. Moreover, because of the general symmetry of the coil configuration shown in Figure 3, in which the straight lengths of the sinuous coil grids are arranged mutually at right angles, cooling water passing between the grids and convolutions of the coil unit is effectively cooled thereby although it may enter the unit in different directions.

As shown in Figure 6, one corner of this grid group, namely an inner corner adjacent to the storage tank 26, by each grid including long and short straight lengths, is left open for reception of the impeller means 32, which comprises a propeller carried rotatively by the lower end of a vertical shaft driven by motor 38. The grid group thus forms an L-shaped ice nest.

The impeller is driven in such direction as to force the cooling liquid downward in the tank. This propulsion of the water causes it to pass through the apertures in the web of the tapered channel supporting member 54 shown in Figure 2 and also through the opening between the adjacent ends of the channel members 52 and 54 to flow longitudinally away from the ice nest compartment beneath approximately one-half of the storage tank 26 (Figures 6 and 7). Such water also passes upward along the corresponding side of the storage tank, as shown in Figures 7 and 8, moving in the same general longitudinal direction.

Some of the water flowing beneath the storage tank which reaches its remote end rises through the central opening 94 (Figure 6) between the adjacent ends of the tank's supporting brackets 60, mixing with water flowing along the side of the tank, and ultimately flows oppositely along the other side of the tank returning to the refrigeration coil compartment. The rest of the water flowing beneath the storage tank away from the refrigeration coil compartment completely circles the tank bottom, returning to the refrigeration coil compartment beneath most of the other half of the bottom as indicated by the broken arrows in Figure 6. As shown, the unperforated channel 52 diverts the outgoing flow so that it must move under and around one side of the tank. The longitudinal channel 50 partitioning the space between the tank bottoms restricts this outflow to the right side of the storage tank centerline as seen in Figure 6. Most of the water will therefore rise and completely circle the tank before returning to the refrigeration coil compartment, although some may double back on the same side of the tank. The general flow back into such compartment swirls between the grids and convolutions of the refrigeration coil unit to lower the temperature of the cooling water before recirculation.

It is also important to note that the cooling system will function effectively, although at a reduced rate, even without the impeller in operation, by thermal circulation or convection flow in the cooler tank. This results from the fact that the water cooled in the open refrigeration compartment of the tank becomes more dense and settles to its bottom through the ice nest as it loses heat to the refrigeration coil unit.

At the same time, water flowing along the bottom, sides and end wall of the storage tank 26 receives heat from the milk in the storage tank, thereby cooling it. Such temperature increase in this cooling water reduces its density and causes it to rise.

The effect of the settling of the water in the refrigeration coil compartment and rising of the water in the space between the storage tank and the cooler tank is that water will tend to flow from the bottom of the refrigeration coil compartment toward the storage tank, and from the top of the space between the storage tank and cooler tank toward the refrigeration compartment. Since this water cannot flow through the unperforated channel 52, the flow must be away from the refrigeration coil compartment beneath one half of the tank, then around the end of the storage tank remote from the refrigeration compartment and beneath the other portion of the storage tank bottom, up over its sides, and back to the upper portion of the refrigeration coil compartment. This is the same general path of flow followed by the cooling liquid when driven by the action of impeller 32. Consequently, a definite circulatory flow is established in the cooler tank 14 under all conditions of operation to maintain an even storage temperature in the storage tank.

In using the device, the refrigeration unit will be set into operation in advance of milking time in order to reduce the temperature of the cabinet to the desired value. Also a supply or coating of ice 30' will have been formed on the ice nest coil. As milk is poured into the receiving tank 66 and is cooled and aerated in flowing down the sides of the storage tank, the impeller 36 will be operated to insure rapid transfer of heat from the walls of the storage tank to the water in it. The water will be kept cool despite its rapid absorption of heat from the milk as it is circulated between the convolutions of the ice nest and melts the ice in it. When the storage tank is filled with milk at a uniformly cooled temperature, the impeller may be deenergized and the milk maintained at that storage temperature by the thermal or convection flow of the water alone, which will be kept sufficiently cool by the refrigerant flowing through the coil even though all the ice has been melted off the ice nest tubing during the initial chilling operation of the milk. The refrigeration unit will be controlled by a thermostat responsive to the thickness of the ice on the refrigeration coil so that such thickness does not exceed a desired value. The control details are conventional and therefore require no further explanation.

In Figures 9, 10 and 11 somewhat different coil and baffle arrangements are shown. In this instance the coil 31, instead of being composed of a series of grids stacked in parallel arrangement, is formed of two generally helical coils disposed concentrically. The inner coil, as shown, may have convolutions of true helical shape, so that the exterior of this coil section conforms to a cylindrical surface. This inner coil is in series with an outer coil, the convolutions of which are substantially rectangular.

As best shown in Figure 10, the central convolutions of the outer coil have one side located closer to the inner coil than the corresponding sides of the remaining convolutions in the outer coil. This construction provides ample clearance for the cooling liquid circulating impeller 32 to rotate even when considerable ice has accumulated on the exterior of the coil tubing. As explained previously, except when the storage tank 26 is being filled, the impeller 32 normally will not be operating. During that period ice will be accumulating on the refrigeration coil, and obviously the coil must be spaced from the path of the impeller blades sufficiently so that the maximum possible ice accumulation will not be struck by the impeller when its rotation is initiated.

The baffle arrangement for guiding circulation of the cooling liquid around the storage tank 26 also is different from that shown in the previously described embodiment of the invention. In this instance, as shown best in Figures 10 and 11, the impeller 32 is located between the adjacent edges of baffle plates 53, sloping downwardly and outwardly from the impeller. Integral with these baffle plates, edges of which conform to and abut the walls of tank 26, are strips 55 extending along almost the full length of the tank, but preferably stopping somewhat short of its end remote from the refrigerating coil compartment, as shown in Figure 9.

In addition, a generally wedge-shaped divider 57 extends transversely of the cooler tank 14 beneath the impeller 32. Preferably this structure runs from side to side of the tank, and serves to divide positively the flow from the impeller, so that part of it will be recirculated through the refrigeration coil compartment, and the remainder of the flow will be deflected beneath the storage tank 26 to circulate around it in the manner indicated in Figure 9.

In this instance, therefore, the combined action of the baffle plates 53 and 55 and of the divider 57 is to guide the flow of cooling liquid from the refrigeration coil compartment beneath the entire bottom of the storage tank 26 and then upward at the end of such tank remote from the refrigeration coil compartment past the ends of the baffle plates 55. The cooling liquid will then return to the upper portion of the refrigeration coil compartment along the sides of the storage tank in the spaces between them and the walls of the cooler tank. When the impeller 32 is not operating, thermal convection flow of the cooling liquid will occur in the same circulatory path as when the impeller 32 is operating, as explained previously.

Within the refrigeration compartment two general paths of flow prevail. The portion of the flow from impeller 32 passing to the left of the divider 57, as seen in Figure 9, moves across the bottom of the refrigeration coil compartment and up along its left side in a generally clockwise path. In such movement the water passes upward through the lower left portion of the coil. Near the center of the coil this flow meets a counterclockwise flow of cooling water entering the refrigeration coil compartment from the upper portion of the space surrounding the storage tank 26. As these two currents meet each other, considerable turbulence is created, which improves the heat exchange action between the coil and the cooling water and facilitates melting of ice from the coil to cool the water more quickly. These two flows then merge and pass through the central portion of the refrigeration coil to the impeller 32 and the entrance between the baffle plates 53 and the divider 57, shown best in Figure 11.

In this tank installation the drain 59 from the storage tank 26 is located at its end opposite the refrigeration coil compartment, instead of being adjacent to such compartment as is the drain 58 shown in the devices of Figure 1. Other features of this storage unit may be generally similar to the features of the embodiment previously described.

Still a further modification of the storage unit is shown in Figures 12, 13 and 14, which generally combines the parallel grid type of refrigeration coil used in the unit shown in Figure 1, and a circulation control baffling arrangement somewhat similar to that incorporated in the unit of Figure 9. Instead of the impeller 32 being located in one corner of the refrigeration coil compartment, as in the form of Figure 1, it is disposed approximately mid-way between the sides of the cooler tank 14 as in the form of Figure 9 shown in Figure 10.

In this instance, however, no sacrifice in length of refrigeration coil tubing is necessitated. This result is achieved by locating the plane of the impeller 32 midway between the planes of two adjacent grids, and the adjacent portions of these grids are bent oppositely away from the plane of the impeller to afford adequate clearance for its blades. In the particular instance illustrated a straight stretch of the grid above the impeller extends transversely of the cooling tank 14, and the connecting bend is swung to shift this stretch upwardly. In the grid immediately beneath the impeller the central loop is in registry with it and the end of this loop is bent downwardly to afford clearance for the impeller.

In this installation accelerating impeller 32 is located between the adjacent ends of baffle plates 53 sloping outwardly and downwardly to the sides of the cooling tank 14 as in the installation of Figure 9, shown best in Figures 10 and 11. These baffles again are integral with dividing strips 55 extending along the sides of the storage tank 26. In this instance, however, these strips extend clear to the end of the cooler tank remote from the refrigeration coil compartment, and may continue across the end wall of the storage tank a greater or lesser distance to provide an opening of desired width at that point. Such an arrangement insures that the cooling water will flow not only from the bottom of the storage tank upward along the sides, but also upward over the end of the storage tank remote from the refrigeration coil compartment.

The divider 57 in the form of Figure 9, being uniform from side to side of the cooler tank, would tend to distribute the current of cooling water more or less evenly across the tank, and since the impeller is at the center, the main current would be directed toward the center of the storage tank bottom which rests on the bottom of the cooler tank 14. For that reason it is necessary for the cooling water to flow toward the sides of the cooler tank, and some turbulence may be produced as the flow undergoes this division.

In the modification of Figures 12, 13 and 14, division of the flow is facilitated by providing a wedge-shaped divider 57' having sides inclined downwardly and toward the sides of the cooler tank 14. The flow of cooling water will be directed readily toward opposite sides of the tank by this divider. To prevent water flowing along such divider from being propelled back into the refrigeration coil compartment, walls 52' and 54' are provided, which close the space between the baffles 53 and the divider 57'. Despite these partition walls, however, adequate recirculatory flow through the refrigeration coil compartment is effected by locating the rotative axis of the impeller 32 approximately in the same plane as the partitions 52' and 54', so that currents are set up on opposite sides of these partitions, one divided into two parts flowing around the storage tank, and the other circulating through the refrigeration coil compartment.

The circulatory flow around the storage tank will be approximately the same as described in connection with the embodiment of Figure 9, except that a more positive division of the incoming cooling water will be accomplished and better circulation of this cooling water over the end of the storage tank remote from the refrigeration coil space will be effected. In the refrigeration coil compartment itself there will be counter flows of liquid around opposite sides of the refrigeration coil exterior, which will merge as they flow toward the impeller through the spaces within the central portion of the coil, generally as illustrated in Figure 12.

As stated with relation to the embodiment of my milk storage unit shown in Figures 9, 10 and 11, additional features of the unit shown in Figures 12, 13 and 14 will be generally similar to the corresponding elements of the form shown in Figure 1 and need not be described in detail.

I claim as my invention:

1. Liquid cooling and storing apparatus comprising an elongated cooler tank containing cooling fluid, a refrigeration coil received wholly within and of a size substantially filling one end portion of said cooler tank to refrigerate said cooling fluid, a storage tank received within the other end portion of said cooler tank, spaced longitudinally of said cooler tank from said refrigeration coil, extending over the major portion of the length of said cooler tank, and having side walls spaced slightly inwardly from corresponding walls of such other end portion of said cooler tank and a bottom disposed below at least the major portion of said refrigeration coil and adjacent to the bottom of said cooler tank, defining a narrow circulation space for cooling fluid unobstructed by refrigeration coil, impeller means alongside the wall of said storage tank adjacent to said refrigeration coil, means driving said impeller means in a direction to propel cooling fluid from said refrigeration coil downward, and baffle means disposed for engagement by such cooling fluid propelled by said impeller means to induce such fluid to flow into the circulation space beneath said storage tank and thence upward through the circulation space between the side walls of the storage tank and cooler tank back to said impeller means.

2. Liquid cooling and storing apparatus comprising an elongated cooler tank containing cooling fluid, a refrigeration coil received within one end portion of said cooler tank to refrigerate said cooling fluid, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, impeller means alongside the wall of said storage tank adjacent to said refrigeration coil operable to propel cooling fluid from said refrigeration coil into such circulation space, and sectionalized cover means for said cooler tank including a first removable lid covering and substantially coextensive in length with said storage tank, a second and closely adjoining removable lid overlying and carrying said impeller means, and a third removable lid closely adjoining the second, overlying and carrying said refrigeration coil unit to complete the closure of said cooler tank.

3. Liquid cooling and storing apparatus comprising an elongated cooler tank containing cooling fluid, a refrigeration coil received within one end portion of said cooler tank to refrigerate said cooling fluid and including a stack of sinuous, generally planar tubing grids arranged in registry and spaced parallel relationship, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, and an impeller alongside the wall of said storage tank adjacent to said refrigeration coil, disposed vertically generally midway between the top and bottom of said refrigeration coil adjacent to one side thereof and in registry with the space between adjacent grids, the edge portions of such adjacent grids being deflected oppositely from their respective planes in divergent relationship to increase the clearance between the impeller and the refrigeration means.

4. The apparatus defined in claim 3, in which each grid of the refrigeration coil includes a plurality of substantially straight parallel lengths of tubing, said straight tubing lengths in adjacent superposed grids being disposed mutually perpendicular.

5. Liquid cooling and storing apparatus comprising an elongated cooler tank containing cooling fluid, a refrigerating coil received within one end portion of said cooler tank to refrigerate said cooling fluid and having inner and outer concentric helices connected in series, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, and an impeller alongside the wall of said storage tank adjacent to said refrigeration coil operable to propel cooling fluid from said refrigeration coil into such circulation space and disposed adjacent to the exterior helix of said coil and generally centrally between its ends, the portion of at least one outer helix convolution adjacent to said impeller being closer to said inner helix than corresponding portions of other convolutions of the outer helix to increase the clearance between said impeller and said refrigeration coil.

6. Liquid cooling and storing apparatus comprising an elongated cooler tank containing cooling fluid, a refrigeration coil received within one end portion of said cooler tank to refrigerate said cooling fluid, a storage tank received within the other end portion of said cooler tank and having side walls spaced slightly inwardly from corresponding walls of such other end portion of said cooler tank, baffle means within said cooler tank extending lengthwise alongside and exteriorly of said storage tank between the top and bottom thereof and defining a circulation space between opposite sides of said storage tank and said cooler tank divided thereby into upper and lower portions, and impeller means operable to propel cooling fluid from said refrigeration coil into one of such circulation space portions for return through the other circulation space portion.

7. Liquid cooling and storing apparatus comprising an elongated cooler tank containing cooling fluid, a refrigeration coil received within one end portion of said cooler tank to refrigerate said cooling fluid, a storage tank of generally rectangular plan form received within the other end portion of said cooler tank and having side walls spaced slightly inwardly from corresponding walls of such other end portion of said cooler tank, and an end wall remote from said refrigeration coil spaced slightly inwardly from the wall of said cooler tank remote from said refrigeration coil, baffle means extending lengthwise of said storage tank between the top and bottom thereof and partially through the space between the end wall of said storage tank remote from said refrigeration coil and a corresponding end of said cooler tank and defining circulation space at opposite sides of said cooler tank divided into upper and lower portions, and impeller means operable tto propel cooling fluid from said refrigeration coil into one of such circulation space portions for return through the other circulation space portion.

8. Liquid cooling and storing apparatus comprising an elongated cooler tank containing cooling fluid, a refrigeration coil received within one end portion of said cooler tank to refrigerate said cooling fluid, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, an impeller operable to propel cooling fluid from said refrigeration coil into such circulation space, and baffle plates having edges adjacent to opposite sides of said impeller, respectively, and inclined outwardly and downwardly therefrom to the opposite sides of said cooler tank.

9. The apparatus defined in claim 8, and a wedge-shaped flow divider disposed beneath the impeller and dividing the fluid propelled thereby into two flow streams.

10. The apparatus defined in claim 9, in which the ridge of the flow divider extends lengthwise of the cooler tank and divides the flow from the impeller into two flow streams directed toward the opposite sides of the cooler tank.

11. Liquid cooling and storing apparatus comprising an elongated cooler tank of generally rectangular plan form containing cooling fluid, a refrigeration coil received wholly within and of a size substantially filling one end portion of said cooler tank to refrigerate said cooling fluid, a storage tank of generally rectangular plan form received within the other end portion of said cooler tank, spaced longitudinally of said cooler tank from said refrigeration coil, having its length extending lengthwise of said cooler tank over a major portion of the length of said cooler tank, and having side walls spaced slightly inwardly from corresponding walls of such other end portion of said cooler tank and a bottom disposed below at least the major portion of said refrigeration coil and adjacent to the bottom of said cooler tank, defining a narrow circulation space for cooling fluid unobstructed by refrigeration coil, impeller means alongside the wall of said storage tank adjacent to said refrigeration coil, means driving said impeller means in a direction to propel cooling fluid from said refrigeration coil downward, and baffle means disposed for engagement by such cooling fluid propelled by said impeller means to induce such fluid to flow into the circulation space beneath said storage tank and thence upward through the circulation space between the side walls of the storage tank and cooler tank back to said impeller means.

12. Liquid cooling and storing apparatus comprising an elongated cooler tank containing cooling fluid, a refrigeration coil of generally cubical conformation received within one end portion of said cooler tank to refrigerate said cooling fluid, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, and an impeller alongside the wall of said storage tank adjacent to said refrigeration coil disposed generally mid-way between the top and bottom of said refrigeration coil and adjacent thereto and operable to propel cooling fluid from said refrigeration coil into such circulation space.

13. Liquid cooling and storing apparatus comprising an elongated cooler tank containing cooling fluid, a refrigeration coil of generally cubical conformation received within one end portion of said cooler tank to refrigerate said cooling fluid, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, and an impeller alongside the wall of said storage tank adjacent to said refrigeration coil received between generally central convolutions of said refrigeration coil and adjacent thereto and operable to propel cooling fluid from said refrigeration coil into such circulation space.

14. Liquid cooling and storing apparatus comprising an elongated cooler tank containing cooling fluid, a refrigeration coil of generally cubical conformation received within one end portion of said cooler tank to refrigerate said cooling fluid, a storage tank received within the other end portion of said cooler tank and having side walls spaced slightly inwardly from corresponding walls of such other end portion of said cooler tank and a bottom adjacent to the bottom of said cooler tank defining a narrow circulation space for cooling fluid unobstructed by refrigeration coil, impeller means disposed adjacent to said refrigeration coil, means driving said impeller means in a direction to propel cooling fluid from said refrigeration coil toward such circulation space, and baffle means located adjacent to said impeller means and operable to induce flow of fluid propelled thereby initially over a predetermined portion of said storage tank adjacent to one side of said baffle means and thereafter over the portion of said storage tank adjacent to the opposite side of said baffle means.

References Cited in the file of this patent

UNITED STATES PATENTS

| | | |
|---|---|---|
| 539,363 | Johnson | May 14, 1895 |
| 1,151,985 | Yeatman | Aug. 31, 1915 |
| 1,574,179 | Strang | Feb. 23, 1926 |
| 2,024,639 | Greene | Dec. 17, 1935 |
| 2,076,809 | Candor | Apr. 13, 1937 |
| 2,128,784 | Tull | Aug. 30, 1938 |
| 2,217,253 | Hughes | Oct. 8, 1940 |
| 2,364,154 | Markley | Dec. 5, 1944 |
| 2,425,519 | Duncan | Aug. 12, 1947 |